(12) United States Patent
Tucker

(10) Patent No.: US 8,223,342 B2
(45) Date of Patent: Jul. 17, 2012

(54) METHODS AND SYSTEMS FOR MEASURING TARGET MOVEMENT WITH AN INTERFEROMETER

(75) Inventor: James R. Tucker, San Diego, CA (US)

(73) Assignee: Alliant Techsystems Inc., Alrington, VA (US)

( * ) Notice: Subject to any disclaimer, the term of this patent is extended or adjusted under 35 U.S.C. 154(b) by 538 days.

(21) Appl. No.: 12/404,815

(22) Filed: Mar. 16, 2009

(65) Prior Publication Data

US 2010/0231921 A1    Sep. 16, 2010

(51) Int. Cl.
G01B 9/02    (2006.01)
G01B 11/02    (2006.01)

(52) U.S. Cl. ........................................ 356/493

(58) Field of Classification Search .................. 356/455, 356/487, 493, 508–510
See application file for complete search history.

(56) References Cited

U.S. PATENT DOCUMENTS

| | | | |
|---|---|---|---|
| 4,707,129 A * | 11/1987 | Hashimoto et al. | 356/4.09 |
| 5,757,491 A * | 5/1998 | Cai et al. | 356/508 |
| 6,252,667 B1 | 6/2001 | Hill et al. | |
| 6,563,593 B2 * | 5/2003 | Hill | 356/510 |
| 6,757,066 B2 | 6/2004 | Hill | |
| 6,806,962 B2 | 10/2004 | Hill | |
| 6,947,148 B2 * | 9/2005 | Hill | 356/493 |
| 7,158,236 B2 * | 1/2007 | Schluchter | 356/500 |
| 7,193,126 B2 | 3/2007 | Bier et al. | |
| 7,262,860 B2 | 8/2007 | Hill | |
| 7,268,888 B2 | 9/2007 | Hill | |
| 7,283,248 B2 | 10/2007 | Hill | |
| 7,289,226 B2 | 10/2007 | Hill | |
| 7,321,432 B2 | 1/2008 | Hill | |
| 7,330,272 B2 * | 2/2008 | Belt et al. | 356/487 |
| 7,333,214 B2 * | 2/2008 | Sesko | 356/493 |
| 7,542,149 B2 * | 6/2009 | Spanner et al. | 356/498 |
| 2002/0033951 A1 * | 3/2002 | Hill | 356/510 |
| 2006/0072119 A1 | 4/2006 | Hill et al. | |
| 2006/0087657 A1 | 4/2006 | Holmes et al. | |
| 2007/0008548 A1 * | 1/2007 | Shibazaki et al. | 356/498 |
| 2007/0008550 A1 * | 1/2007 | Tobiason et al. | 356/510 |
| 2007/0115478 A1 | 5/2007 | Ray | |
| 2007/0229843 A1 * | 10/2007 | Sesko | 356/493 |
| 2010/0141957 A1 * | 6/2010 | Hou et al. | 356/487 |
| 2010/0231921 A1 * | 9/2010 | Tucker | 356/493 |

* cited by examiner

Primary Examiner — Patrick J Connolly
(74) Attorney, Agent, or Firm — TraskBritt

(57) ABSTRACT

Systems and methods are disclosed for an interferometer system. An interferometer system may comprise a plurality of light sources, wherein each light source of the plurality is configured to transmit a source beam. The interferometer system may also include an interferometer including a polarizing beam splitter and a reference reflector. The interferometer is configured to receive the source beam and transmit a measurement beam to a target reflector and a reference beam to the reference reflector. Additionally, the interferometer system may include a plurality of receivers, wherein each receiver of the plurality is associated with a light source and configured to receive a mixed beam comprising a reflected measurement beam and a reflected reference beam. Moreover, the interferometer is configured to receive at least one source beam at an angle with respect to an axis perpendicular to a side of the interferometer configured to receive the source beam.

25 Claims, 8 Drawing Sheets

METHODS AND SYSTEMS FOR MEASURING TARGET MOVEMENT WITH AN INTERFEROMETER

TECHNICAL FIELD

Embodiments of the present invention relate generally to interferometers and, more specifically, to interferometer systems and methods for measuring multiple targets using a common beam splitter and a common reference reflector.

BACKGROUND

Displacement measuring interferometers are well known in the art, and are used to measure changes in a position of a measurement object relative to a reference object based on an optical interference signal. A displacement measuring interferometer may generate an optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and thereafter combine the reflected measurement and reference beams to form overlapping exit measurement and reference beams. The overlapping exit beams form an output beam that subsequently passes through a polarizer. The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams.

A detector measures the time-dependent intensity of the mixed beam and generates an electrical interference signal proportional to the intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, the measured beat frequency includes a Doppler shift equal to $2\nu np/\lambda$, where $\nu$ is the relative speed of the measurement and reference objects, $\lambda$ is the wavelength of the measurement and reference beams, n is the refractive index of the medium through which the light beams travel (e.g., air or vacuum) and p is the number of passes to the reference and measurement objects. Changes in the relative position of the measurement object correspond to changes in the phase of the measured interference signal, with a $2\pi$ phase change substantially equal to a distance change L of $\lambda/(np)$, where L is a round-trip distance change (e.g., the change in distance to and from a stage that includes the measurement object).

FIG. 1 illustrates a conventional interferometer device 100 including a light source 110 and receiver 118. Light source 110 is configured to produce a source beam 112 having two beam components with nominally orthogonal polarizations and different frequencies. For example, a first beam component with a first frequency is nominally linearly polarized in the plane of the figure and a second beam component with a second frequency is nominally linearly polarized in a direction perpendicular to the plane of the figure. Interferometer device 100 also includes a target reflector 116, a reference reflector 128, and a polarization beam splitter 126 having a polarizing beam splitting interface 124. For purposes of this description, polarization beam splitter 126 and reference reflector 128 may also be commonly referred to as interferometer 114.

During operation, light source 110 transmits source beam 112 to polarizing beam splitting interface 124 which separates source beam 112 into a measurement beam 120 and a reference beam 121. Reference beam 121 is reflected by polarizing beam splitter interface 124 and travels along a reference path to reference reflector 128, which then reflects reference beam 121 back to polarizing beam splitting interface 124. Simultaneously, measurement beam 120 is transmitted by polarizing beam splitting interface 124 and travels along a measurement path to target reflector 116. Measurement beam 120 is then reflected back from target reflector 116 to polarizing beam splitting interface 124. Measurement beam 120 and reference beam 121 are then recombined after their respective passes to target and reference reflectors 116, 128 to form mixed output beam 122 having an optical interference signal that is detected by receiver 118. Changes in the relative position of the target reflector 116 may be determined by monitoring changes in the phase of the interference signal at a frequency corresponding to a difference frequency between the measurement and reference beams.

FIG. 2 illustrates a conventional single beam interferometer device 200 including a light source 210 and receiver 218. Similar to light source 110 as illustrated in FIG. 1, light source 210 is configured to produce a source beam 212 having two beam components with different frequencies. Interferometer device 200 also includes quarter-wave plates 230, 231, a target reflector 216, a reference reflector 228, and polarization beam splitter 226 having a polarizing beam splitting interface 224. For purposes of this description, polarization beam splitter 226, quarter-wave plates 230, 231, and reference reflector 228 may also be commonly referred to as interferometer 214.

During operation, light source 210 transmits source beam 212 to polarizing beam splitting interface 224, which separates source beam 212 into a measurement beam 220 and a reference beam 221. Reference beam 221 is reflected by polarizing beam splitting interface 224 and is transmitted along a reference path through quarter-wave plate 230 to a reference reflector 228. Reference reflector 228 then reflects reference beam 221 back through quarter-wave plate 230 to polarizing beam splitting interface 224. Simultaneously, measurement beam 220 is transmitted through polarizing beam splitting interface 224 along a measurement path and through quarter-wave plate 231 to target reflector 216. Measurement beam 220 is then reflected from target reflector 216 back through quarter-wave plate 231 to polarizing beam splitting interface 224. After their respective passes to target and reference reflectors 216, 228, measurement beam 220 and reference beam 221 are recombined to form mixed output beam 222 having an optical interference signal that is detected by receiver 218. Changes in the relative position of the target reflector 216 may be determined by monitoring changes in the phase of the interference signal at a frequency corresponding to a difference frequency between the measurement and reference beams.

Despite the advances that have been made in the field of displacement measuring interferometers, measurement errors and inaccuracies still persist when using conventional apparatus and methods. For example, relative errors may exist due to the fact that each interferometer device within an interferometer system is referenced to a different polarizing beam splitter and reference reflector. FIG. 3 illustrates a conventional interferometer system 301 including a plurality of interferometer devices 300. As illustrated, each interferometer device 300 within interferometer system 301 includes a light source 310, a target reflector 316, and a receiver 318. Furthermore, each interferometer device 300 is referenced to a different interferometer 314 (i.e., interferometer 114 or 214 described above in reference to FIGS. 1 and 2, respectively). As a result, upon detection of movement of a target reflector 316 by a corresponding interferometer system 300, it may be difficult to determine whether the target reflector 316 has moved, or whether the reference reflector (not shown) within the corresponding interferometer 314 has moved.

Furthermore, another disadvantage in having multiple polarizing beam splitters and reference reflectors within an interferometer system 301 is that each interferometer device 300 within the interferometer system 301 may require its own window or port 392 through an environmental chamber 394. As known by one of ordinary skill in the art, each port through an environmental chamber may increase the expense of an interferometer system and may decrease the structural integrity of the environmental chamber.

There is a need to increase the accuracy of an interferometer system and of interferometer-based displacement measuring methods. Specifically, there is a need for methods and systems for an interferometer system configured to measure a plurality of targets using a common beam splitter and a common reference reflector.

BRIEF SUMMARY OF THE INVENTION

An embodiment of the present invention comprises an interferometer system. The system comprises a plurality of light sources, wherein each light source of the plurality is configured to emit a source beam. The interferometer system also includes an interferometer including a polarizing beam splitter and a reference reflector. The interferometer is configured to receive the source beam and transmit a measurement beam to a target reflector and a reference beam to the reference reflector. Additionally, the interferometer system includes a plurality of receivers wherein each receiver of the plurality is associated with a light source and configured to receive a mixed beam comprising a reflected measurement beam and a reflected reference beam. Moreover, the interferometer is configured to receive at least one source beam at an angle with respect to an axis perpendicular to a side of the interferometer configured to receive the source beam.

Another embodiment of the present invention includes an interferometer system comprising a plurality of source-receiver devices. The interferometer system is configured to measure movement of a plurality of targets using a common polarizing beam splitter and a common reference reflector.

Another embodiment of the present invention includes a method of operating an interferometer system. The method comprises providing at least one source-receiver device and transmitting one or more source beams from the at least one source-receiver device to an interferometer. The at least one source beam is transmitted to the interferometer at an angle with respect to an axis perpendicular to a side of the interferometer configured to receive the source beam. Furthermore, the method comprises receiving a mixed output beam including an interference signal at the at least one source-receiver device.

Another embodiment of the present invention includes a method of operating an interferometer system. The method comprises measuring movement of a plurality of targets using a common polarizing beam splitter and a common reference reflector.

Yet another embodiment of the present invention includes an interferometer cluster system. The interferometer cluster system comprises a plurality of interferometer systems wherein each interferometer system comprises an interferometer and a plurality of source-receiver devices. Each source-receiver device of the plurality is configured to emit a source beam and receive a mixed beam comprising a measurement beam and a reference beam. Furthermore, at least one source-receiver device is oriented at an angle with respect to an axis perpendicular to a side of the interferometer configured to receive the source beam.

DETAILED DESCRIPTION OF THE INVENTION

In the following detailed description, reference is made to the accompanying drawings which form a part hereof and in which is shown, by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, functions may be shown in block diagram form in order not to obscure the present invention in unnecessary detail. Furthermore, specific implementations shown and described are only examples and should not be construed as the only way to implement the present invention unless specified otherwise herein. Block definitions and partitioning of logic between various blocks represent a specific, non-limiting implementation. It will be readily apparent to one of ordinary skill in the art that the various embodiments of the present invention may be practiced by numerous other partitioning solutions. For the most part, details concerning timing considerations, and the like, have been omitted where such details are not necessary to obtain a complete understanding of the present invention in its various embodiments and are within the abilities of persons of ordinary skill in the relevant art.

Referring in general to the following description and accompanying drawings, various aspects of the present invention are illustrated to show its structure and method of operation. Common elements of the illustrated embodiments are designated with like numerals. It should be understood that the figures presented are not meant to be illustrative of actual views of any particular portion of the actual structure or method, but are merely idealized representations which are employed to more clearly and fully depict the present invention.

Figure 1:
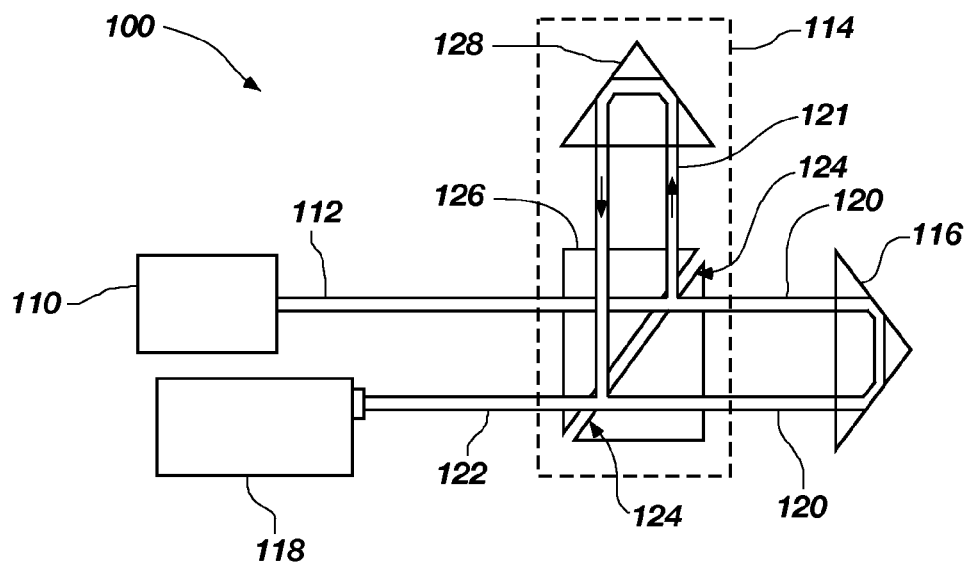
FIG. 1 illustrates a conventional displacement measuring interferometer device.
Figure 2:
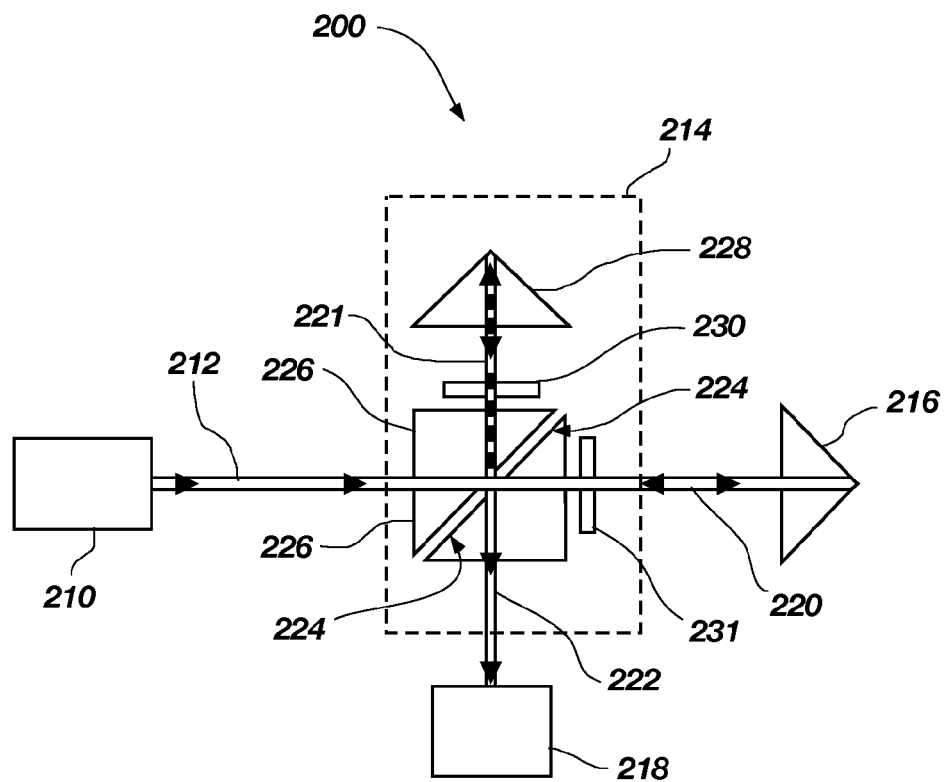
FIG. 2 illustrates a conventional single beam displacement measuring interferometer device.
Figure 3:
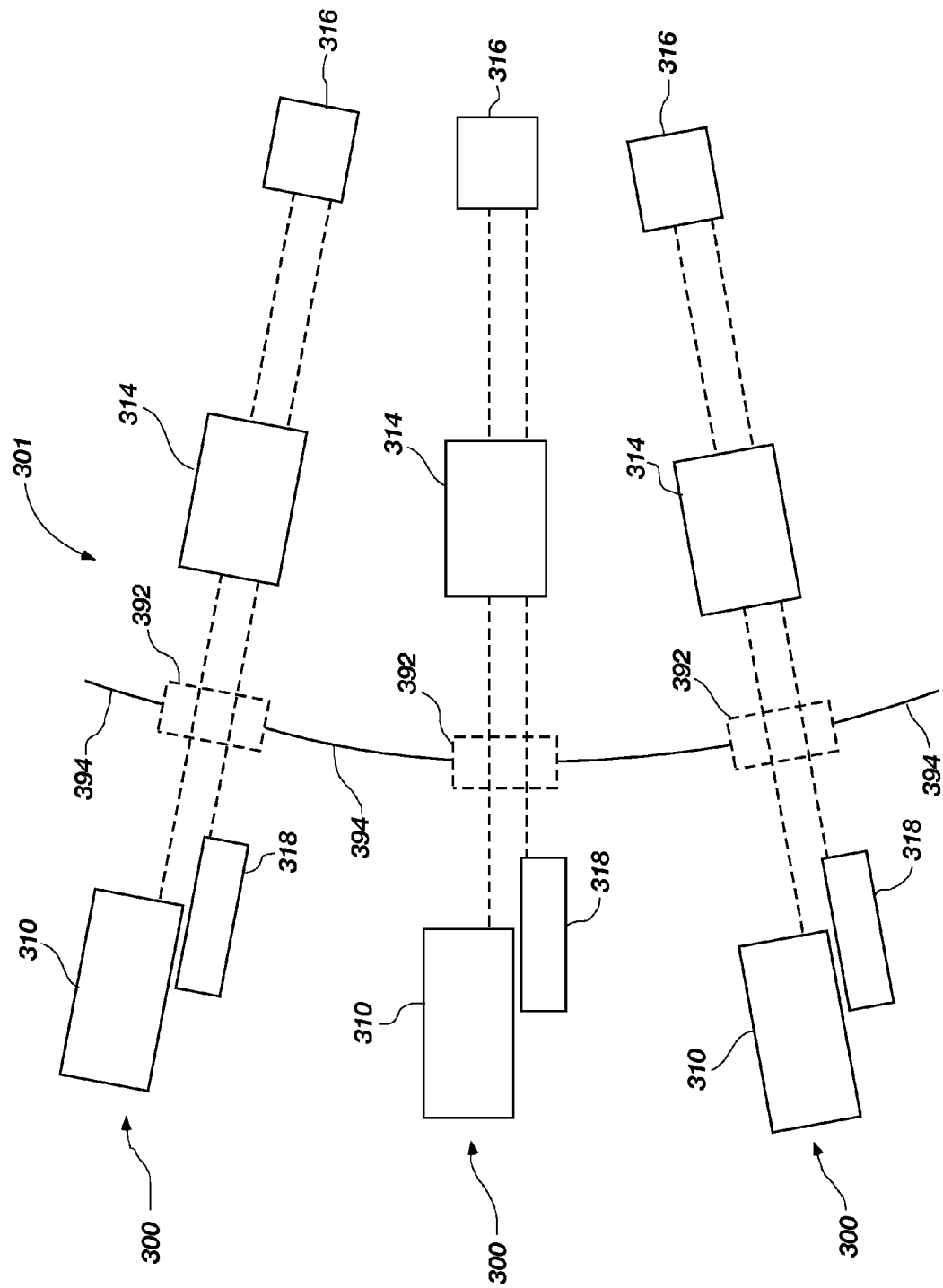
FIG. 3 illustrates a conventional interferometer system including a plurality of displacement measuring interferometer devices.
Figure 4:
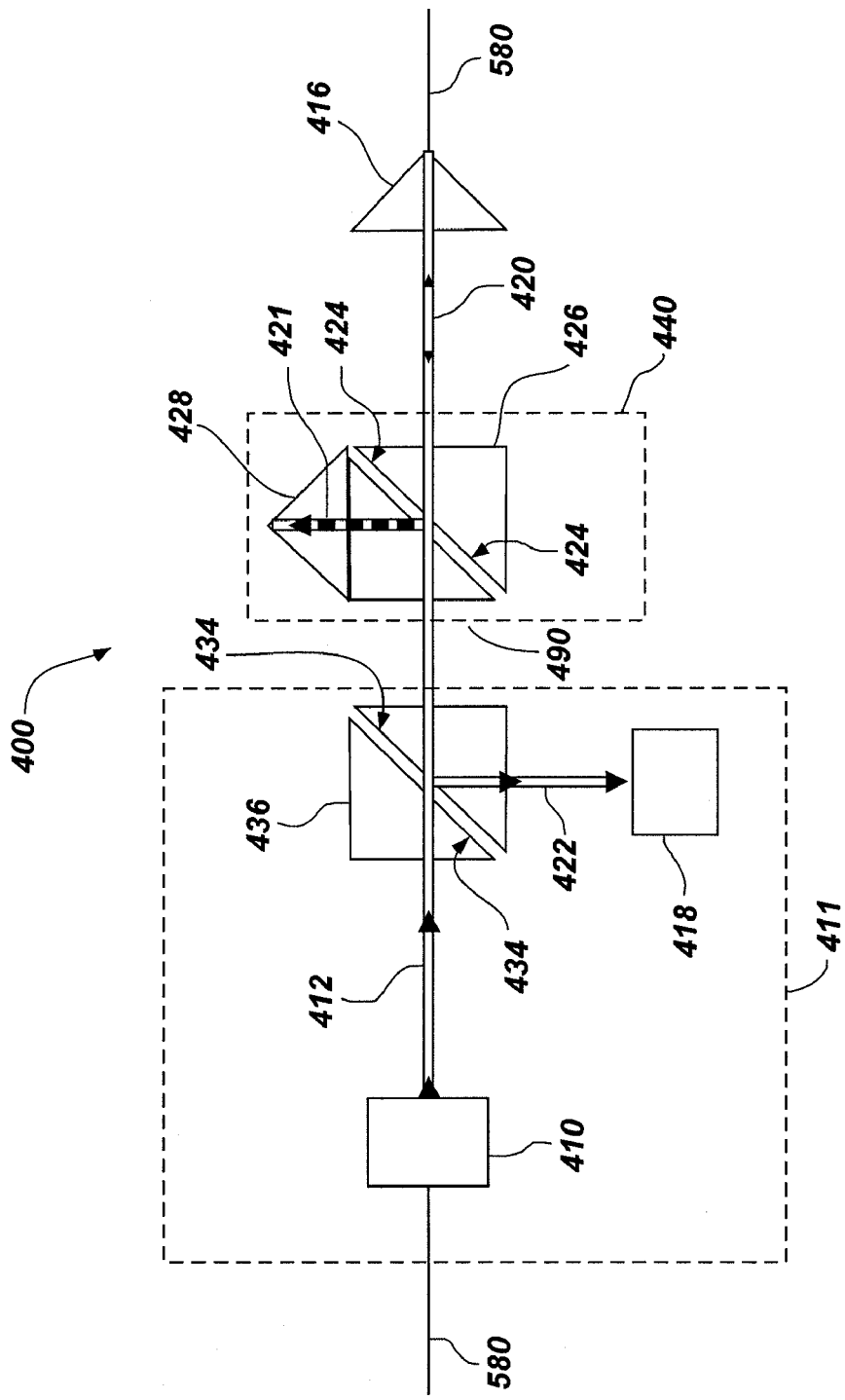
FIG. 4 illustrates a single beam interferometer device.

FIG. 4 illustrates a single beam interferometer device 400 having a light source 410 and receiver 418. In a similar manner to light sources 110 and 210 (see FIGS. 1 and 2), light source 410 may be configured to produce and transmit a source beam 412 having two beam components with different frequencies. For example, light source 410 may include an acousto-optical modulator used to introduce frequency splitting to produce the two frequency components. In another example, light source 410 may include a Zeeman-split laser to produce the frequency splitting. In yet another example, the different frequencies may be produced internal to light source 410 using birefringent elements. Interferometer device 400 also includes a target reflector 416 and a reference reflector 428. For example only and not by way of limitation, reference reflector 428 may comprise a reference corner cube or a mirror. Interferometer device 400 may also include a beam splitter 436 having beam splitting interface 434, and a polarizing beam splitter 426 having a polarizing beam splitter interface 424. As illustrated in FIG. 4, reference reflector 428 is adjacent to polarization beam splitter 426. For purposes of this description, reference reflector 428 and polarization beam splitter 426 will hereinafter also be collectively referred to as interferometer 440. For example only, interferometer 440 may comprise a Michelson interferometer. Moreover, hereinafter, light source 410, beam splitting interface 434 and receiver 418 may also be collectively referred to as source-receiver device 411.

During a contemplated operation of interferometer device 400, source beam 412 is emitted from light source 410 and transmitted along an axis 580 through beam splitter 436 to polarizing beam splitting interface 424. Upon reaching polarizing beam splitting interface 424, source beam 412 is separated into a measurement beam 420, which travels along a measurement path, and a reference beam 421, which travels along a reference path. After reaching reference reflector 428, reference beam 421 is reflected back to polarizing beam splitting interface 424. Similarly, after reaching target reflector 416, measurement beam 420 is reflected back to polarizing beam splitting interface 424. Measurement beam 420 and reference beam 421 are then recombined after their respective passes to target and reference reflectors 416, 428 to form mixed output beam 422 having an optical interference signal. Mixed output beam 422 is then transmitted to beam splitting interface 434 and reflected towards and detected by receiver 418. Receiver 418 may include a photodetector (not shown) configured to measure a time-dependent intensity of mixed output beam 422 and generate an electrical interference signal proportional to that intensity. Changes in the relative position of target reflector 416 may be determined by monitoring changes in the phase of the interference signal at a frequency corresponding to a difference frequency between measurement beam 420 and reference beam 421.

As known by one of ordinary skill in the art, by measuring the movement of a target reflector in space, temporal, thermal, and mechanical strain between points on a target attached to the target reflector may be calculated. These calculations may then be used to predict the mechanical and thermal stability of the target. Specific details concerning the configuration and operation of interferometer device 400 (e.g., details concerning polarization of measurement beam and source beam) are known by one of ordinary skill in the art, and therefore have not been described in order to avoid unnecessarily obscuring embodiments of the present disclosure.

Figure 5:
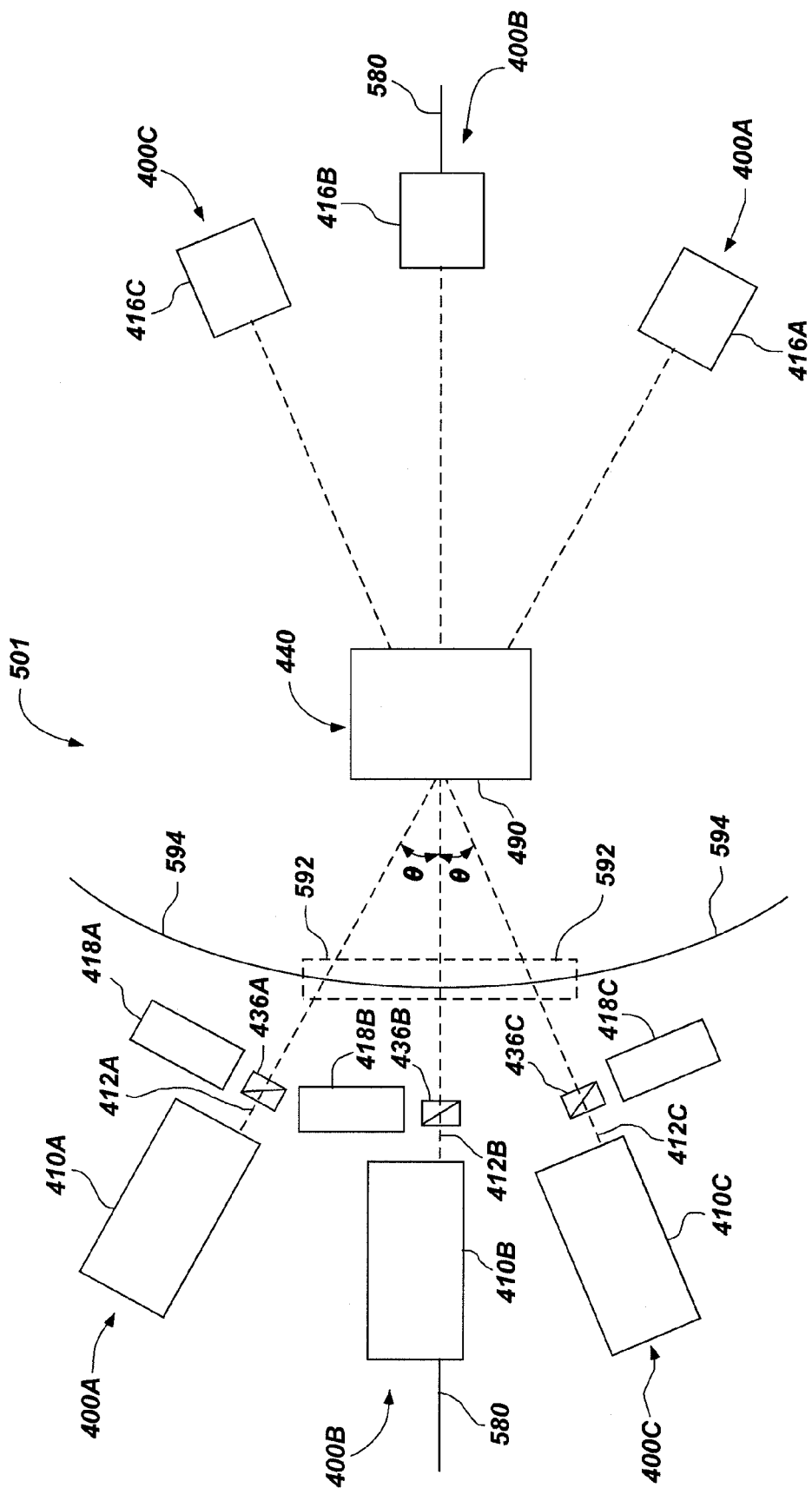
FIG. 5 illustrates an interferometer system including a plurality of interferometer devices, according to an embodiment of the present invention.

FIG. 5 illustrates an interferometer system 501 having a plurality of interferometer devices 400A, 400B, and 400C, in accordance with an embodiment of the present disclosure. Each interferometer device 400A, 400B, and 400C within interferometer system 501 may operate in a manner similar to that of interferometer device 400 illustrated in FIG. 4. As illustrated, interferometer system 501 includes light sources 410A, 410B, and 410C and corresponding targets 416A, 416B, and 416C. Additionally, each interferometer device 400A, 400B, and 400C includes respective beam splitters 436A, 436B, and 436C, and respective receivers 418A, 418B, and 418C. Furthermore, interferometer system 501 includes a single interferometer 440. Therefore, each interferometer device 400A, 400B, and 400C within interferometer system 501 is referenced to a common polarization beam splitter 426 and a common reference reflector 428 (see FIG. 4).

In addition to including interferometer device 400B configured to transmit a source beam 412B along axis 580 substantially perpendicular to a face or a side 490 of interferometer 440 configured to receive a source beam, interferometer system 501 may also include one or more additional interferometer devices (e.g., interferometer devices 400A and 400C) that are oriented at an angle $\Theta$ with respect to axis 580. Stated another way, one or more additional interferometer devices (i.e., interferometer devices 400A and 400C) may be titled off of axis 580 at angle $\Theta$ and may be configured to transmit a source beam (i.e., source beams 412A and 412C) to interferometer 440 at angle $\Theta 0$ with respect to axis 580. For proper operation of each interferometer device 400A, 400B, and 400C, interferometer 440 must be able to separate each transmitted source beam into a reference beam and a measurement beam. Consequently, an angular limit may exist for angle $\Theta$. A source beam transmitted to interferometer 440 at an angle greater than the angular limit may produce cross-talk and prevent measurement and reference beams from having adequate signal-to-noise ratios. Interferometer system 501 may include one or more interferometer devices in the plane of the figure and one or more interferometer devices out of the plane of the figure. For example only and not by way of limitation, interferometer system 501 may include one or more interferometer devices that are tilted off of axis 580 by up to approximately 15 degrees (i.e., a source beam may be transmitted to interferometer 440 at angle $\Theta$ with respect to axis 580 of substantially 15 degrees or less). It should be noted that more than one interferometer device 400A, 400B, and 400C within interferometer system 501 may operate simultaneously due to the fact that a transmitted source beam 412 enters interferometer 440 (at side 490) and a respective mixed output beam 422 exits interferometer 440 (at side 490) at substantially the same angle.

Furthermore, as illustrated in FIG. 5, each interferometer device 400A, 400B, and 400C within an interferometer system 501 may transmit a source beam through a single port 592 in an environmental chamber 594. Therefore, the number of ports needed in interferometer system 501 may be reduced compared to conventional interferometer systems. For example only and not by way of limitation, environmental chamber 594 may comprise a cryogenic chamber.

Implementing an interferometer system having a plurality of interferometer devices each referenced to a common interferometer may be used to increase the accuracy of the interferometer system by reducing the relative error, as described above. For example, when movement is detected in only one target (e.g., target 416C) in interferometer system 501, it may be easily determined that target 416C has in fact moved. On the other hand, if a similar amount of movement is detected in each target 416A, 416B, 416C within interferometer system 501, it may be easily determined that the reference reflector (not shown) within interferometer 440 has moved rather than a target. In addition to increasing accuracy, referencing a plurality of interferometer devices to a common polarizing beam splitter and common reference reflector may reduce component count, decrease expense of an interferometer system, and increase stability of an environmental chamber. Although interferometer system 501 includes three interferometer devices 400A, 400B, and 400C, an interferometer system having any number of interferometer devices is within the scope of an embodiment of the present disclosure.

Figure 6:
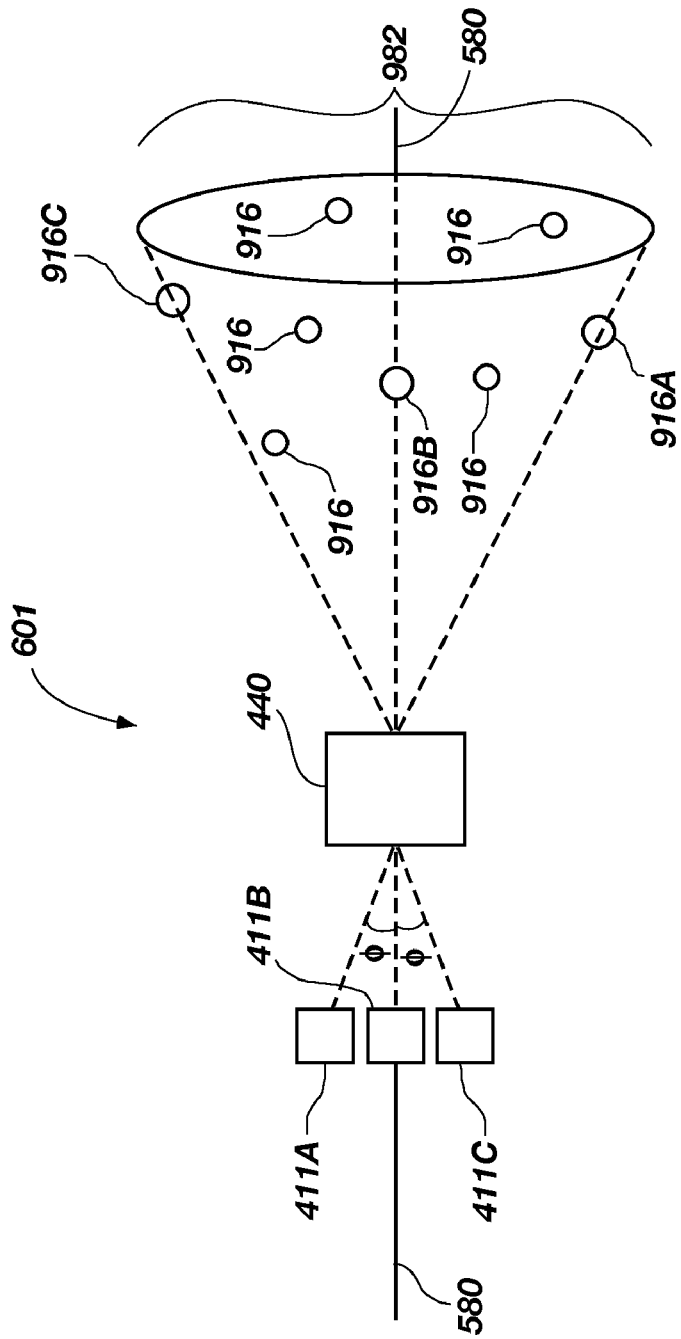
FIG. 6 illustrates a plurality of interferometer systems sharing a common interferometer and producing a test area, according to an embodiment of the present invention.

FIG. 6 illustrates an interferometer system 601 having interferometer 440 and source-receiver devices 411A, 411B, 411C and configured to measure movement of targets 916A, 916B, and 916C, respectively. As illustrated, source-receiver devices 411A and 411C are oriented at angular limit Φ with respect to axis 580 and configured to transmit a source beam to interferometer 440 at angular limit Φ so as maintain proper operation of interferometer 440. As illustrated in FIG. 6, interferometer system 601 produces a test area 982, wherein targets 916 within test area 982 may be visible to interferometer system 601. By adding additional source-receiver devices to interferometer system 601 within angular limit Φ, targets 916 located within test area 982 may be visible to and monitored by interferometer system 601.

Figure 7:
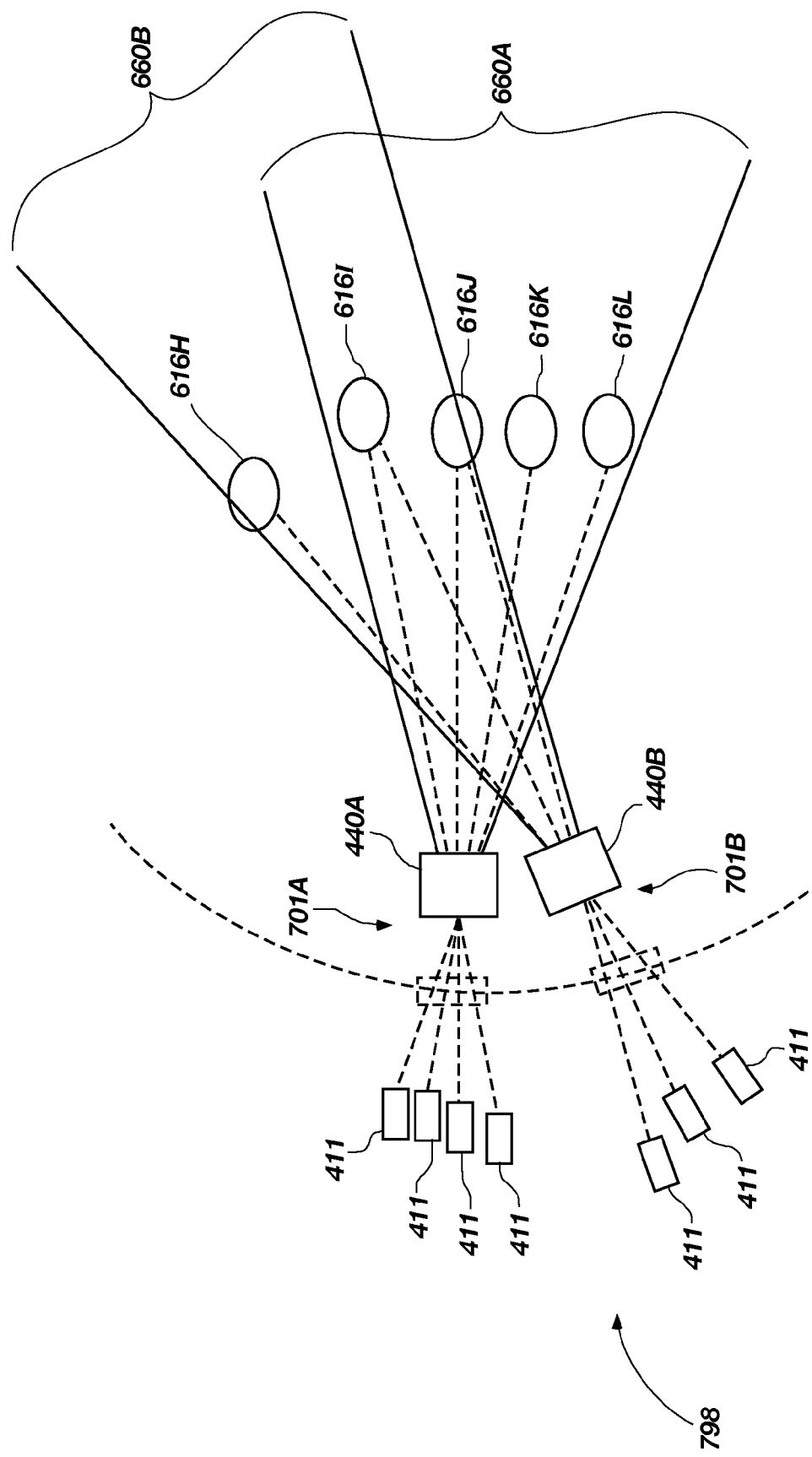
FIG. 7 illustrates an interferometer cluster system including a plurality of interferometer systems producing overlapping test areas, in accordance with an embodiment of the present invention.

FIG. 7 illustrates a plurality of interferometer systems 701A and 701B, which may also be referred to as an "interferometer cluster system 798." Each interferometer system 701A and 701B within interferometer cluster system 798 includes an associated interferometer 440A, 440B, and a plurality of source-receiver devices 411. Furthermore, interferometer cluster system 798 as depicted includes a plurality of targets 616H through 616L. As described above in reference to FIG. 5, an angular limit may exist for an off-axis tilt, and, therefore, a test area 660A which is visible to interferometer system 701A may also be limited. As a result, a target outside of test area 660, such as target 616H, may not be visible to interferometer system 701A. Therefore, in order to provide complete coverage of targets 616H through 616L, another interferometer system 701B may be added to interferometer cluster system 798 and rotated sufficiently from interferometer system 701A in order to produce test area 660B and provide coverage to target 616H. Furthermore, in order to provide increased accuracy, interferometer systems 701A and 701B may monitor and measure the movement of common targets within both test areas 660A and 660B, such as targets 616I and 616J.

Figure 8:
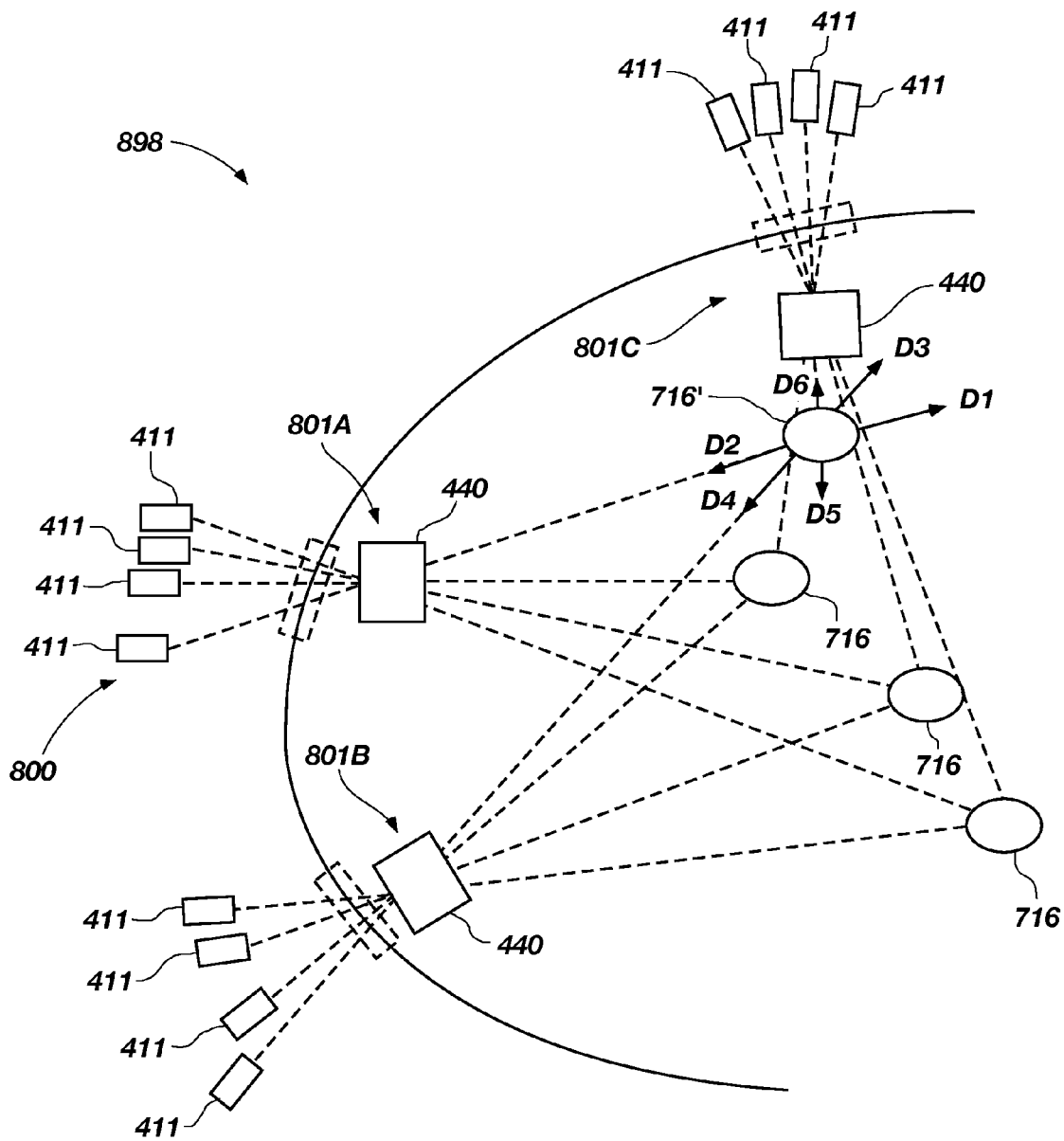
FIG. 8 illustrates a plurality of interferometer systems sharing common targets, according to an embodiment of the present invention.

FIG. 8 illustrates an interferometer cluster system 898 having interferometer systems 801A, 801B, and 801C. Each interferometer system 801A, 801B, and 801C includes a plurality of source-receiver devices 411 and an interferometer 440. Furthermore, each interferometer system 801A, 801B, and 801C may be configured to monitor and measure movement of targets 716. As known by one having ordinary skill in the art, measuring a target with an interferometer device in more than one interferometer system may increase accuracy of the measurements by detecting movement in an increased number of directions. More specifically, if a target (e.g., target 716') is only measured by one interferometer device (e.g., interferometer device 800) in interferometer system 801A, movement may only be detected and measured in two directions, such as directions illustrated by arrows D1 and D2. (i.e., in a direction away from source-receiver device 411 and a direction toward source-receiver device 411). Conversely, by measuring target 716' with multiple interferometer devices, each within a different interferometer system, movement may be detected and measured in more than two directions, such as directions illustrated by arrows D1, D2, D3, D4, D5, and D6. Consequently, as illustrated, interferometer cluster system 898 may provide measurement of the movement of each target 716 in six directions.

Figure 9:
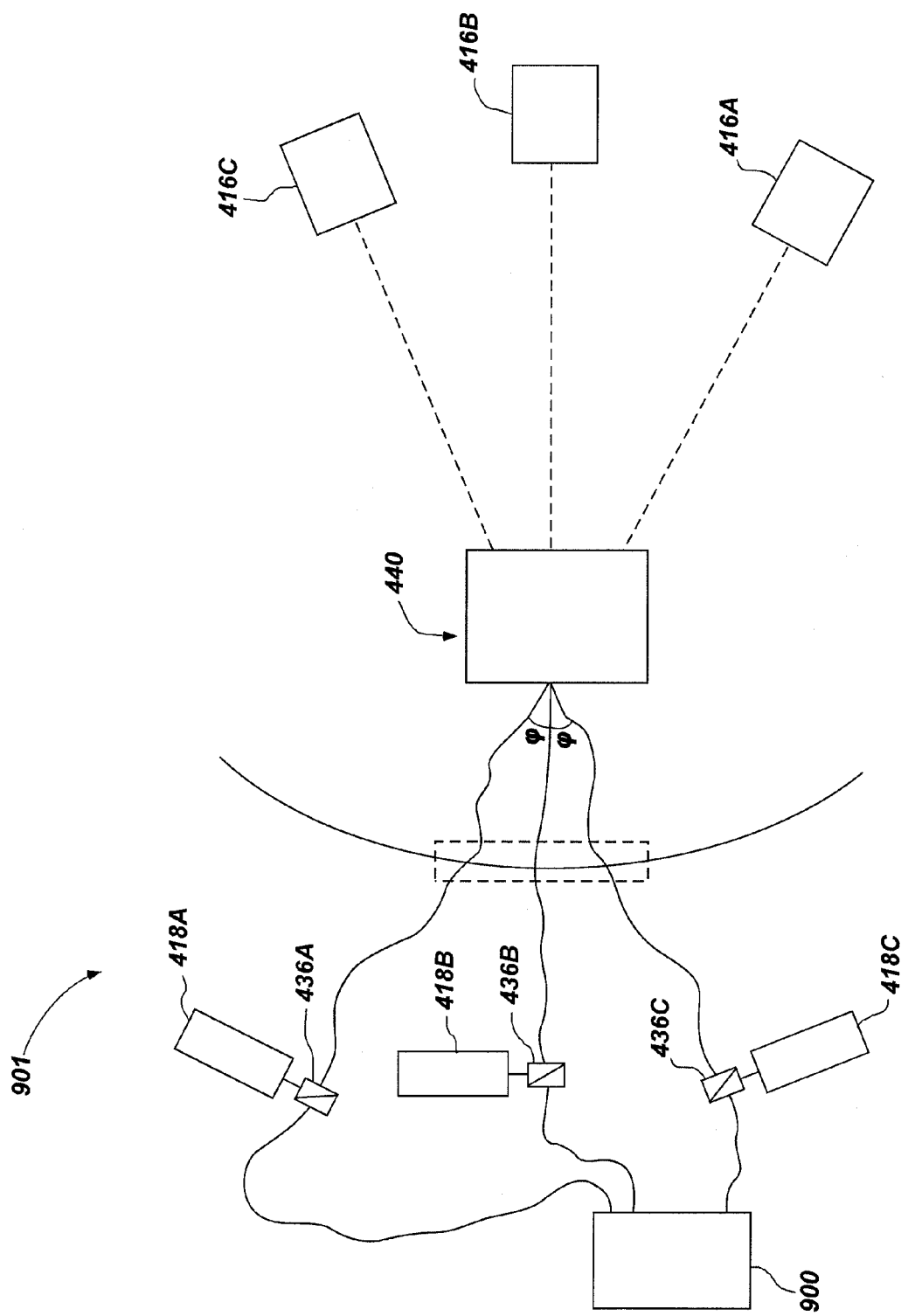
FIG. 9 illustrates an interferometer system including a plurality of interferometer devices having a common laser source, in accordance with an embodiment of the present invention.

FIG. 9 illustrates an interferometer system 901 having a single laser 900 configured to supply a plurality of output beams (e.g., source beam 412 as described above in reference to FIGS. 4 and 5) to interferometer 440. For example only and not by way of limitation, single laser 900 may supply a plurality of output beams to interferometer 440 by implementing optical fiber, one or more half-wave plates, or one or more mirrors, such as on-axis folds. Additionally, interferometer system 901 may be configured to transmit a mixed output beam, as described above in reference to FIG. 4, from interferometer 440 to an appropriate beam splitter 436A, 436B, and 436C by implementing optical fiber, one or more half-wave plates, or one or more on-axis folds. Furthermore, the mixed output beam may be transmitted from beam splitter 436, 436A, 436B, and 436C to receiver 418, 418A, 418B, and 418C implementing optical fiber, one or more half-wave plates, or one or more on-axis folds. Using optical fiber, half-wave plates, or on-axis folds to transmit laser beams from laser 900 to interferometer 440 and from interferometer 440 to receiver 418 may decrease the packaging density of interferometer system 901 due to the fact that only a single laser is required. Moreover, design flexibility may be improved due to the fact that laser 900 does not need to be in linear alignment with interferometer 440 and each target 416A, 416B, and 416C. It should be noted that, although packaging density and design flexibility may be improved, an angular limit Φ, as described above in reference to FIG. 5, may still exist for the injection of each source beam to interferometer 440.

Specific embodiments have been shown by way of example in the drawings and have been described in detail herein; however, the invention may be susceptible to various modifications and alternative forms. It should be understood that the invention is not intended to be limited to the particular forms disclosed. Rather, the invention includes all modifications, equivalents, and alternatives falling within the scope of the invention as defined by the following appended claims, and their legal equivalents.

What is claimed is:

1. An interferometer system, comprising:
a plurality of light sources, each light source of the plurality configured to transmit a source beam;
an interferometer including a polarizing beam splitter and a reference reflector and configured to receive the source beam and transmit a measurement beam to a target reflector and a reference beam to the reference reflector; and
a plurality of receivers, each receiver of the plurality associated with a light source and configured to receive a mixed output beam comprising a reflected measurement beam and a reflected reference beam;

wherein the interferometer is configured to receive at least one source beam transmitted at an angle with respect to an axis perpendicular to a side of the interferometer configured to receive the at least one source beam.

2. The system of claim 1, further comprising a plurality of beam splitters, each beam splitter of the plurality positioned between the interferometer and an associated light source and configured to transmit the source beam to the interferometer and reflect the mixed output beam to an associated receiver.

3. The system of claim 2, wherein each beam splitter of the plurality comprises a beam splitting interface and each polarizing beam splitter comprises a polarizing beam splitter interface.

4. The system of claim 1, wherein the interferometer is configured to receive the at least one source beam transmitted at an angle of 15 degrees or less with respect to the axis perpendicular to the side of the interferometer configured to receive the at least one source beam.

5. The system of claim 1, wherein each receiver of the plurality is configured to detect an optical interference signal of the mixed output beam.

6. The system of claim 1, wherein the reference reflector comprises at least one of a reference corner cube and a mirror.

7. The system of claim 1, wherein the interferometer comprises a Michelson interferometer.

8. The system of claim 1, wherein each light source is configured to transmit a source beam through a single port in a chamber positioned between each light source and the interferometer.

9. The system of claim 1, wherein at least one light source of the plurality is oriented to transmit a source beam at an angle of substantially 15 degrees or less with respect to the axis perpendicular to the side of the interferometer configured to receive the at least one source beam.

10. An interferometer system, comprising:
including a plurality of source-receiver devices, each source-receiver device a light source, a beam splitting interface, and a receiver; and
a common interferometer comprising a common polarizing beam splitter and a common reference reflector and configured to receive a source beam from each source-receiver device of the plurality of source-receiver devices;
wherein the interferometer system is configured to measure movement of a plurality of targets using the common interferometer.

11. A method of operating an interferometer system, comprising:
providing a plurality of light sources;
transmitting a source beam from each of the plurality of light sources to an interferometer, wherein at least one source beam is transmitted to the interferometer at an angle with respect to an axis perpendicular to a side of the interferometer configured to receive the at least one source beam; and
receiving a mixed output beam including an interference signal at a receiver associated with at least one light source of the plurality of light sources.

12. The method of claim 11, wherein providing the plurality of light sources comprises providing a beam splitter associated with the receiver and each of the plurality of light sources.

13. The method of claim 12, wherein transmitting the source beam from each of the plurality of light sources comprises transmitting the source beam from each of the plurality of light sources through the associated beam splitter to the interferometer.

14. The method of claim 11, wherein transmitting the source beam from each of the plurality of light sources to the interferometer at the angle comprises transmitting the at least one source beam to the interferometer at an angle of substantially 15 degrees or less with respect to the axis perpendicular to the side of the interferometer configured to receive the at least one source beam.

15. The method of claim 11, wherein transmitting the source beam from each of the plurality of light sources to the interferometer comprises transmitting the source beam from each of the plurality of light sources to an interferometer comprising a polarizing beam splitter and a reference reflector.

16. The method of claim 11, further comprising transmitting a measurement beam to a target reflector and a reference beam to a reference reflector after transmitting the source beam to the interferometer.

17. The method of claim 16, further comprising receiving a reflected measurement beam and a reflected reference beam at the interferometer after transmitting the measurement beam to the target reflector and the reference beam to the reference reflector.

18. The method of claim 11, wherein providing the plurality of light sources comprises providing one or more light sources oriented at an angle with respect to the axis perpendicular to the side of the interferometer.

19. The method of claim 11, wherein providing the plurality of light sources comprises providing a plurality of light sources, each light source of the plurality of light sources configured to transmit an associated source beam to the interferometer through a single window in an environmental chamber.

20. The method of claim 11, wherein providing the plurality of light sources comprises providing a single laser configured to transmit a plurality of source beams.

21. The method of claim 20, wherein transmitting the source beam comprises transmitting the plurality of source beams from the single laser to the interferometer via at least one of an optical fiber, one or more half-wave plates, and one or more on-axis folds.

22. The method of claim 11, wherein receiving the mixed output beam including the interference signal at the receiver comprises receiving the mixed output beam transmitted from the interferometer through a beam splitter to the receiver via at least one of an optical fiber, one or more half-wave plates, and one or more on-axis folds.

23. A method of operating an interferometer system comprising:
measuring movement of a plurality of targets with a plurality of source-receiver devices by:
transmitting a source beam from each of the plurality of source-receiver devices to a common interferometer comprising to a common polarizing beam splitter and a common reference reflector; and
receiving a plurality of mixed output beams from the common interferometer, each mixed output beam received at a corresponding source-receiver device of the plurality of source-receiver devices.

24. An interferometer cluster system, comprising:
a plurality of interferometer systems, each interferometer system comprising:
an interferometer; and
a plurality of source-receiver devices, each source-receiver device configured to transmit a source beam to the interferometer and receive a mixed beam comprising a measurement beam and a reference beam, wherein at least one source-receiver device is oriented to transmit a source beam at an angle with respect to an axis perpendicular to a side of the interferometer configured to receive the source beam.

25. The system of claim 24, wherein at least two interferometer systems of the plurality are configured to measure movement of at least one common target.

* * * * *

UNITED STATES PATENT AND TRADEMARK OFFICE
CERTIFICATE OF CORRECTION

PATENT NO.        : 8,223,342 B2
APPLICATION NO.   : 12/404815
DATED             : July 17, 2012
INVENTOR(S)       : James R. Tucker Page 1 of 1

It is certified that error appears in the above-identified patent and that said Letters Patent is hereby corrected as shown below:

In the claims:
CLAIM 23,   COLUMN 10,   LINE 56,   change "comprising to a common" to --comprising a common--

Signed and Sealed this
Twenty-fourth Day of May, 2016

Michelle K. Lee
*Director of the United States Patent and Trademark Office*